(12) United States Patent
Donaldson (10) Patent No.: US 9,245,514 B2
(45) Date of Patent: Jan. 26, 2016

(54) SPEAKER WITH MULTIPLE INDEPENDENT AUDIO STREAMS

(75) Inventor: Thomas Alan Donaldson, London (GB)

(73) Assignee: AliphCom, San Francisco, CA (US)

( * ) Notice: Subject to any disclaimer, the term of this patent is extended or adjusted under 35 U.S.C. 154(b) by 452 days.

(21) Appl. No.: 13/561,033

(22) Filed: Jul. 28, 2012

(65) Prior Publication Data
US 2013/0129103 A1 May 23, 2013

Related U.S. Application Data

(60) Provisional application No. 61/512,715, filed on Jul. 28, 2011.

(51) Int. Cl.
| H04M 3/56 | (2006.01) |
| G10K 11/16 | (2006.01) |
| H04R 27/00 | (2006.01) |
| H04S 7/00 | (2006.01) |

(52) U.S. Cl.
CPC ................ G10K 11/16 (2013.01); H04R 27/00 (2013.01); H04M 3/564 (2013.01); H04M 3/568 (2013.01); H04R 2499/13 (2013.01); H04R 2499/15 (2013.01); H04S 7/302 (2013.01); H04S 7/303 (2013.01)

(58) Field of Classification Search
CPC ........ H04S 7/302; H04S 7/303; H04M 3/568; H04M 3/564; H04R 27/00; H04R 2499/13; H04R 2499/15; G10K 11/16
USPC ......... 700/94; 381/2, 17, 18, 306, 307, 77, 82
See application file for complete search history.

(56) References Cited

U.S. PATENT DOCUMENTS

| 5,556,107 | A | 9/1996 | Carter |
| 2005/0135643 | A1 | 6/2005 | Lee et al. |
| 2006/0115090 | A1 * | 6/2006 | Kirkeby ......................... 381/17 |
| 2006/0153360 | A1 | 7/2006 | Kellermann et al. |
| 2006/0262935 | A1 | 11/2006 | Goose et al. |
| 2006/0287747 | A1 | 12/2006 | Fay et al. |

(Continued)

FOREIGN PATENT DOCUMENTS

JP            08221081 A  *  8/1996  ............. G10K 11/34

OTHER PUBLICATIONS

Copenheaver, Blaine R., Notification of Transmittal of the International Search Report and the Written Opinion of the International Searching Authority, or the Declaration, mailed Oct. 16, 2012, International Searching Authority.

*Primary Examiner* — Vivian Chin
*Assistant Examiner* — David Ton
(74) *Attorney, Agent, or Firm* — Kokka & Backus, PC (57) ABSTRACT

The various embodiments relate generally to systems, devices, apparatuses, and methods for providing audio streams to multiple listeners, and more specifically, to a system, a device, and a method for providing independent listener-specific audio streams to multiple listeners using a common audio source, such as a set of loudspeakers, and, optionally, a shared audio stream. In some embodiments, a method includes identifying a first audio stream for reception at a first region to be canceled at a second region, and generating a cancellation signal that is projected in another audio stream destined for the second region. The cancellation signal and the first audio steam are combined at the second region. Further, a compensation signal to reduce the cancellation signal at the first region can be generated.

18 Claims, 8 Drawing Sheets

(56) References Cited

U.S. PATENT DOCUMENTS

| | | |
|---|---|---|
| 2007/0223750 A1* | 9/2007 | Bai et al. .................. 381/309 |
| 2009/0086987 A1 | 4/2009 | Wihardja et al. |
| 2009/0191955 A1 | 7/2009 | Seelig et al. |
| 2009/0298587 A1 | 12/2009 | Acharya et al. |
| 2009/0310704 A1 | 12/2009 | Jethanandani et al. |
| 2010/0007773 A1 | 1/2010 | O'Connell et al. |
| 2010/0202633 A1* | 8/2010 | Kim et al. .................. 381/107 |
| 2011/0091029 A1 | 4/2011 | LeBlanc |

* cited by examiner

SPEAKER WITH MULTIPLE INDEPENDENT AUDIO STREAMS

CROSS-REFERENCE TO RELATED APPLICATIONS

This nonprovisional patent application claims the benefit of U.S. Provisional Patent Application No. 61/512,715 filed on Jul. 28, 2011, which is incorporated herein for all purposes.

FIELD

The various embodiments of the invention relate generally to systems, devices, apparatuses, and methods for providing audio streams to multiple listeners, and more specifically, to a system, a device, and a method for providing independent listener-specific audio streams (e.g., individualized audio streams) to multiple listeners using a common audio source, such as a set of loudspeakers, and, optionally, a shared audio stream.

BACKGROUND

There exist some conventional approaches to providing individualized audio to co-located listeners so that each listener hears different audio streams. Traditionally, providing multiple audio streams generally requires that each user is associated with an audio output system, such as headphone, together with some degree of isolation from other user's speaker systems. To illustrate, consider that multiple users typically have their own music players and headphones to enable each user to hear their own music without disrupting others' listening activities. Some drawbacks to this approach are that they typically require individualized sets of hardware and equipment which can be costly.

While functional, conventional echo and noise cancellation techniques, as well traditional cross-talk cancellation, are not well-suited to enhance audio produced on an individualized basis when each of multiple listeners are recipients of different audio streams. For example, conventional echo, noise, and cross-talk cancellation techniques are limited to operating on an audio signal (i.e., limited to a signal audio signal) rather than optimizing audio streams systemically.

What is a desired are a system, an apparatus, and a method for providing independent listener-specific audio streams, such as individualized audio streams, to multiple listeners using a common audio source, such as a set of loudspeakers, the common audio source also configured to provide a shared audio stream.

SUMMARY

In some embodiments, audio systems and generated audio signals provide for different audio streams and/or audio signals to different regions in space, each region can coincide with a location of a user or a listener. The multiple users and/or regions can be co-located adjacent to each other (e.g., in a common space or room in which the different audio streams are produced). In some embodiments, an apparatus can include one or more a crosstalk cancellation filters for one or more audio streams. A crosstalk cancellation filter includes a modified audio signal generator configured to generate one or more cancellation signals based on an audio stream for transmission via a loudspeaker, and a compensation signal generator configured to generate one or more compensation signals to compensate for the one or more cancellation signals. At least in some embodiments, the one or more compensation signals are generated recursively until a threshold magnitude of at least one of the one or more compensation signals is achieved. An example of an apparatus can generate a shared audio stream and generate multiple audio streams via a loudspeaker system. For example, the loudspeaker can include at least a first loudspeaker for a first audio stream and a second loudspeaker for a second audio stream. At least one audio stream is isolated from receiving at least another of the audio streams. Thus, the shared audio provides a predominantly-shared audio experience combined with the individualized user-specific audio streams. For example, in a multi-player gaming environment, all players can to hear the same overall soundtrack relating to the overall game-play, with individual users receiving individualized audio. In particular, different garners can share a screen or video monitor, but may be located virtually in different areas of the game. Therefore, each user may receive different audio tracks appropriate to what their character can hear in the virtual location of the game at which their character resides, or to provide communication (e.g., individualized verbal communication) from other players or virtual characters appropriate to a particular individual user.

DETAILED DESCRIPTION

Various embodiments or examples may be implemented in numerous ways, including as a system, a process, an apparatus, a user interface, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description.

In some examples, the described techniques may be implemented as a computer program or application (hereafter "applications") or as a plug-in, module, or sub-component of another application. The described techniques may be implemented as software, hardware, firmware, circuitry, or a combination thereof. If implemented as software, the described techniques may be implemented using various types of programming, development, scripting, or formatting languages, frameworks, syntax, applications, protocols, objects, or techniques, including ASP, ASP.net, .Net framework, Ruby, Ruby on Rails, C, Objective C, C++, C#, Adobe® Integrated Runtime™ (Adobe® AIR™), ActionScript™, Flex™, Lingo™, Java™, Javascript™, Ajax, Perl, COBOL, Fortran, ADA, XML, MXML, HTML, DHTML, XHTML, HTTP, XMPP, PHP, and others. The described techniques may be varied and are not limited to the embodiments, examples or descriptions provided.

Various embodiments are directed to systems, apparatus, devices, and methods for generating audio streams with cancellation signals and/or compensation signals can implemented in variety of devices that include one or more processors configured to execute instructions to process audio-related data.

Figure 1:
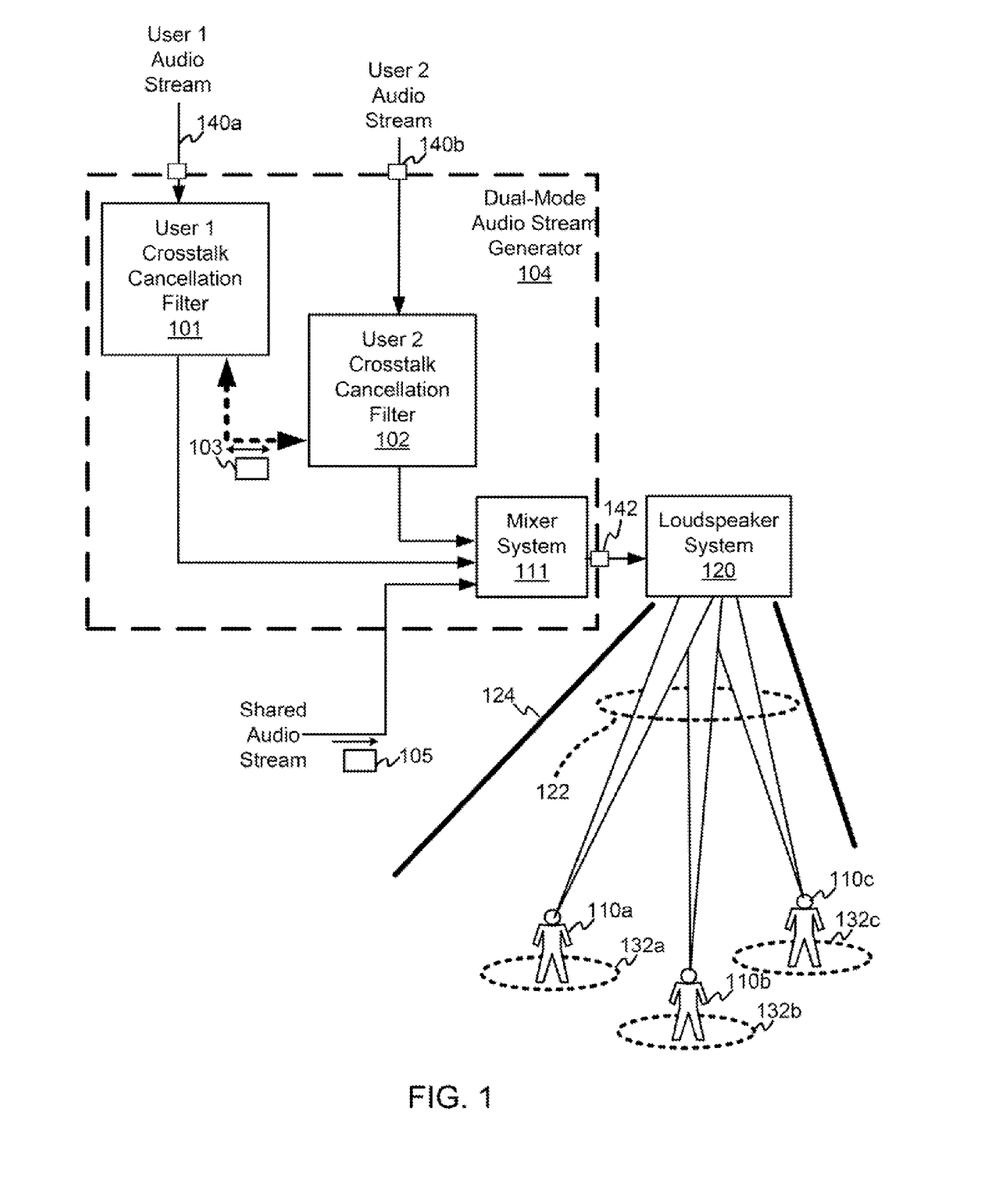
FIG. 1 is a block diagram illustrating a dual mode audio stream generator, according to some embodiments.

FIG. 1 is a block diagram illustrating a dual mode audio stream generator, according to some embodiments. Diagram 100 depicts a dual mode audio stream generator 104 configured to generate shared audio streams and/or individualized audio streams, either serially or concurrently, according to various embodiments. Dual mode audio stream generator 104 includes one or more crosstalk cancellation filters having structures and/functionalities described herein. As an example, dual mode audio stream generator 104 is shown to include crosstalk cancellation filter 101 (e.g., for user 1, such as user 110a) and cancellation filter 102 (e.g., for user 2, such as user 110b), each of which can be configured to generate acoustic signals, such as one or more cancellation signals (and/or compensation signals) based on an audio stream to be transmitted via a loudspeaker system 120. Examples of the audio stream include any of audio streams depicted in FIG. 1, such as individualized audio streams 122. Crosstalk cancellation filters 101 and 102 can optionally exchange audio data as feedback 103 to, for example, generate one or more acoustic signals, such as one or more compensation signals, that are configured to compensate for one or more cancellation signals. Further, dual mode audio stream generator 104 can include a mixer system 111 configured to mix or blend input audio signals applied to input terminals 140a and 140b, as well as shared audio stream data 105, to form an output audio signal at output terminal 142. In operation, mixer system 111 mixes or combines audio streams (e.g., voltages or digital samples) to produce a combination of the input audio streams.

Dual mode audio stream generator 104 can be configured to operate in a first mode or in a second mode, either serially or concurrently. According to a first mode of operation, a shared audio stream is provided to at least a subset of users 110. Shared audio stream envelope 124 depicts common audio that is perceptible by the subset of users 110a, 110b, and 110c. According to a second mode of operation, individualized audio streams 122 are provided to respective regions 132a, 132b, and 132c at which users 110a, 110b, and 110c, respectively, can reside. As dual mode audio stream generator 104 can operate in both modes concurrently, users 110a, 110b, and 110c each can receive a portion of audio that is common to the subset of users 110a, 110b, and 110c, and another portion of the audio that is specific to one of users 110a, 110b, and 110c.

In some examples, crosstalk cancellation filters 101 and 102 are configured to receive two (or more) separate input audio streams via terminals 140a and 140b and generate a first audio stream (e.g., based on input audio stream 140a) that individualized for user 110a (e.g., a first user or listener), whereby user 110 can perceive individualized audio stream 122 for region 132a. Further, crosstalk cancellation filters 101 and 102 are configured to cancel individualized audio streams 122 for regions 132b and 132c that otherwise may be perceptible by 110a in region 132a. As used herein, the term "cancellation" can refer, at least in some embodiments, to a process of reducing or eliminating a magnitude of an audio stream that is intended for another user, whereby individualized audio streams 122 for regions 132b and 132c are cancelled at region 132a to minimize audio streams other than individualized audio stream 122 for region 132a. The description of the term "cancel" need not be limited to imperceptible audio, but a canceled signal can be one that is attenuated such that it is sufficiently imperceptible, at least in some cases. Examples of attenuated signals, without limitation, include magnitudes ranging from 0 dB to 10 dB, or from 0 dB to 50 dB, or greater. As for user 110b (e.g., user 2), crosstalk cancellation filters 101 and 102 similarly are configured to cancel individualized audio streams 122 for regions 132a and 132c that otherwise may be perceptible by 110b in region 132b. Other crosstalk cancellation filters can be added for user 110c, as well as any number of users or audio channels.

In view of the foregoing, and as elaborated further herein, dual mode audio stream generator 104 and/or crosstalk cancellation filters 101 and 102 of the various embodiments, as well as the processes of using the same, can provide structures and/or functionalities for generating audio signals in which multiple users are co-located. In some examples, users 110a, 110b, and 110c can each receive a shared audio stream and an individualized audio stream intended for a specific user or region (in the user resides). As such, dual mode audio stream generator 104 and/or crosstalk cancellation filters 101 and 102 can facilitate multiple levels of communication. At a first level, the shared audio stream is common to all users, whereas on a second level, each user is receives user-specific audio content. The multiple levels of communication have a variety of uses. In one instance, the shared audio can represent background audio from remote conferees in a teleconference that is perceptible to users 110a, 110b, and 110c, which are co-located in a conference room. But a private communication can be conveyed as individualized audio data to, for example, user 110b while being imperceptible to other users 110a and 110c. In another instance, the shared audio can represent audio originating in a portion of a virtual world in a massively multiplayer online game, whereby garners 110a, 110b, and 110c have avatars at the portion of the virtual world and can perceive audio. But individualized audio can be conveyed to any of garners 110a, 110b, and 110c, all of whom can be co-located in a common room. Further, dual mode audio stream generator 104 and/or crosstalk cancellation filters 101 and 102 can facilitate enhancements in audio characteristics. In particular, one or more compensation signals can be generated to ameliorate or otherwise negate the effects of a cancellation signal at a region other than the region for which the cancellation signal is configured, the cancellation signal likely perceived by another user as, for example, an echo. In addition, dual mode audio stream generator 104 and/or crosstalk cancellation filters 101 and 102 can be configured to receive location data representing locations at which users reside, including updated location data. As such, dual mode audio stream generator 104 and/or crosstalk cancellation filters 101 and 102 are configured to detect changes in locations of one or more users and to adjust automatically the cancellation signals and/or compensation signal accordingly. Location data can originate or be determined in associated with a wearable computing device worn by a user. Thus, the location of the wearable computing device can determine the location of a region.

Crosstalk cancellation filters 101 and 102 are configured to receive input audio signals applied to input terminals 140a and 140b, as well as shared audio stream data 105, and are further configured to form an output audio signal at output terminal 142. The audio signals can include audio electrical signals (e.g., analog signals) or digital data signals. The output audio can be a single channel, but can be a multi-channel output signal sufficient to effectively operate loudspeaker system 120. In some instances, the input audio signals applied to input terminals 140a and 140b is any type of audio signal (e.g., monaural, stereo, multi-channel, etc.), as is the output audio signal. In at least one example, the input audio signals applied to input terminals 140a and 140b can be a mono audio electrical or digital data signal, identified as "User 1 Audio Stream" and "User 2 Audio Stream" in FIG. 1. The output is another audio signal, which can be, at least in this example, a mono audio electrical or digital data signal. In some embodiments, shared audio stream data 105 need not be input into a crosstalk cancellation filter, but rather into mixer system 111. Suitable examples of mixer system 111 include analog mixing electrical systems, an analog electrical system integrated into a loudspeaker or amplifier, any digital system such as mixer software instruction code running on a programmed digital signal processor or microprocessor, etc.

Loudspeaker system 120 can include a subset of loudspeakers being operated to provide at least two audio streams simultaneously (or nearly simultaneously) whereby any delays are minimized or negated. A loudspeaker in loudspeaker system 120 being configured to function as a transducer of input electrical signals corresponding to desired audio output acoustic signals to be heard by users. Loudspeaker system 120 can include drivers, amplifiers, etc. In some embodiments, loudspeaker system 120 includes at least two speakers (e.g., for a stereo loudspeaker system), and in general the loudspeaker system provides sufficient volume that users in its vicinity are able to hear the audio. While two or more audio streams via a single set of loudspeakers (e.g., a left speaker and a right speaker) can be used, various implementations can be adapted to include other types of speakers, including arrays of transducers or speakers, etc. Any number of loudspeakers and/or transducers can be used (e.g., in any multi-channel configuration, such as 7.1, 9.1, etc., regardless whether disposed in separate housings or are combined in fewer housings than the number of loudspeakers or transducers). In various embodiments, loudspeakers can be disposed in a speaker array or formed from any type of speaker, either individually or in groups.

Any of the above-described features can be implemented in software, hardware, firmware, circuitry, or any combination thereof. Note that the structures and constituent elements above, as well as their functionality, may be aggregated or combined with one or more other structures or elements. Alternatively, the elements and their functionality may be subdivided into constituent sub-elements, if any. As software, the above-described techniques may be implemented using various types of programming or formatting languages, frameworks, syntax, applications, protocols, objects, or techniques. For example, any of elements in FIG. 1 (or any subsequent figure) can represent one or more algorithms. Or, any of the elements can represent a portion of logic including a portion of hardware configured to provide constituent structures and/or fimctionalities.

For example, any of dual mode audio stream generator 104 (including one or more components, crosstalk cancellation filters 101 and 102 and any of their subcomponents), can be implemented in one or more computing devices, processors, or servers including one or more processors configured to execute one or more algorithms in memory. Thus, an element (or a portion thereof) in FIG. 1 (or any subsequent figure) can represent one or more algorithms, or be implemented by one or more algorithms. Or, any of the elements can represent a portion of logic including a portion of hardware configured to provide constituent structures and/or functionalities. These can be varied and are not limited to the examples or descriptions provided.

As hardware and/or firmware, the above-described structures and techniques can be implemented using various types of programming or integrated circuit design languages, including hardware description languages, such as any register transfer language ("RTL") configured to design field-programmable gate arrays ("FPGAs"), digital signal processor ("DSP"), application-specific integrated circuits ("ASICs"), multi-chip modules, or any other type of integrated circuit. For example, any of dual mode audio stream generator 104 (including one or more components, crosstalk cancellation filters 101 and 102 and any of their subcomponents) can be implemented in one or more computing devices or in one or more circuits, or a combination thereof. Thus, any of elements in FIG. 1 (or any subsequent figure) can represent one or more components of hardware. Or, any of the elements can represent a portion of logic including a portion of circuit configured to provide constituent structures and/or functionalities.

According to some embodiments, the term "circuit" can refer, for example, to any system including a number of components through which current flows to perform one or more functions, the components including discrete and complex components. Examples of discrete components include transistors, resistors, capacitors, inductors, diodes, and the like, and examples of complex components include memory, processors, analog circuits, digital circuits, and the like, including field-programmable gate arrays ("FPGAs"), application-specific integrated circuits ("ASICs"). Therefore, a circuit can include a system of electronic components and logic components (e.g., logic configured to execute instructions, such that a group of executable instructions of an algorithm, for example, and, thus, is a component of a circuit). According to some embodiments, the term "module" can refer, for example, to an algorithm or a portion thereof, and/or logic implemented in either hardware circuitry or software, or a combination thereof. According to some embodiments, the term "engine" can refer, for example, to an algorithm or a portion thereof, and/or logic implemented in either hardware circuitry or software, or a combination thereof (i.e., an engine can be implemented in as a circuit). In some embodiments, algorithms and/or the memory in which the algorithms are stored are "components" of a circuit. Thus, the term "circuit" can also refer, for example, to a system of components, including algorithms. These can be varied and are not limited to the examples or descriptions provided.

Figure 2:
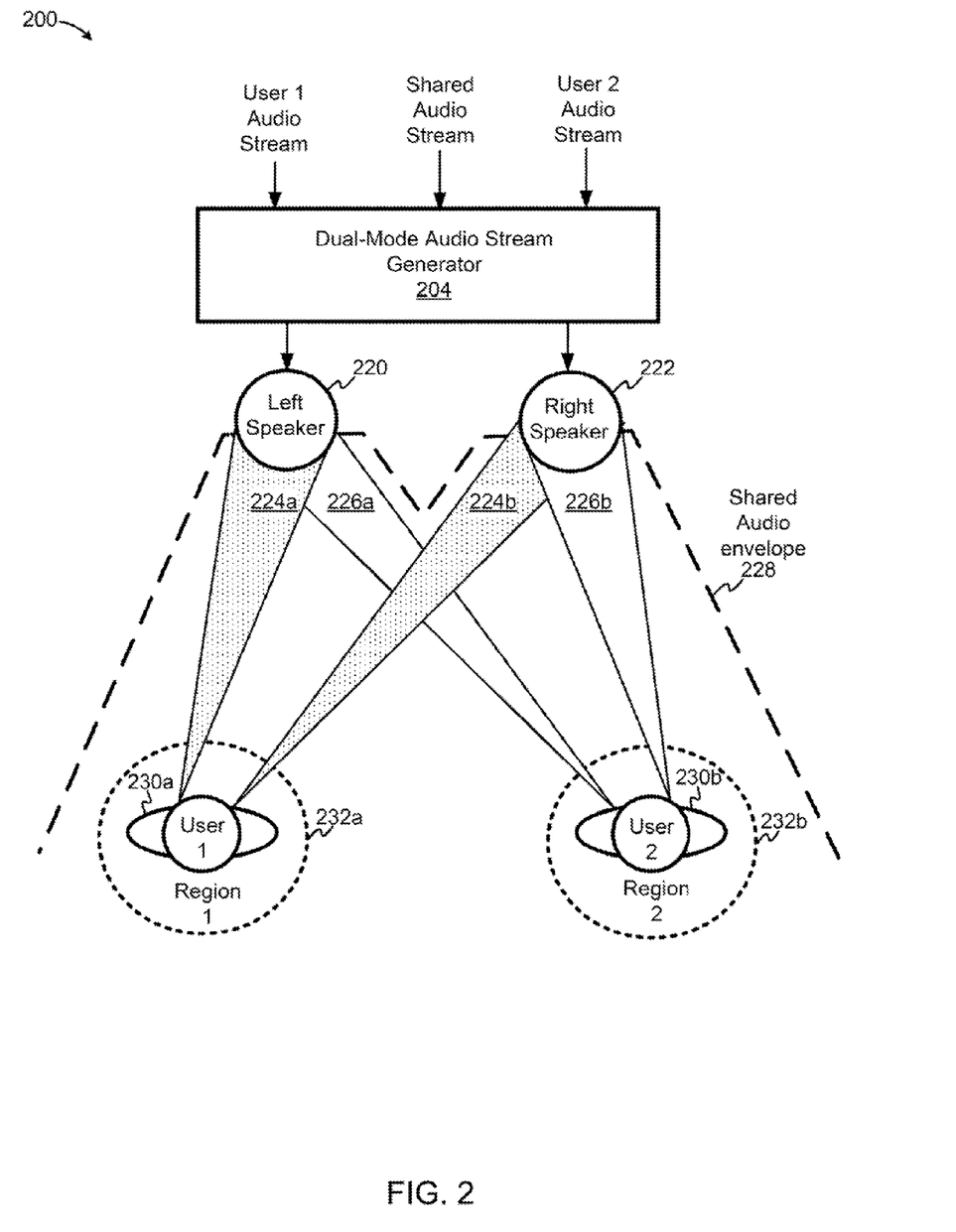
FIG. 2 is a block diagram illustrating an example of a dual mode audio stream generator, according to an embodiment.

FIG. 2 is a block diagram illustrating an example of a dual mode audio stream generator, according to an embodiment. In diagram 200, a dual mode audio stream generator 204 receives input audio (e.g., user 1 audio stream, user 2 audio stream, and shared audio stream), and generates audio and acoustic signals for transmission to a left speaker 220 and a right speaker 222, whereby the acoustic signals are configured to implement individualized audio stream to specific users. Examples of acoustic signals include cancellation signals, compensations signals, and other like signals. While dual mode audio stream generator 204 is configured to generate one or more shared audio streams, as depicted as shared audio envelope 228: As shown, dual mode audio stream generator 204 is configured to convey individualized audio streams to different regions, such as region ("1") 232a and region ("2") 232a. In some cases, region 232a and region 232b are determined by the inclusion of user ("1") 230a and user ("2") 230b, respectively, whereby their locations are determined with the use of corresponding wearable computing devices, or by any other way, including imagery and face recognition techniques. Audio streams 224a and 226b include individualized audio streams originating by left speaker 220 and by right speaker 222 for region 232a and region 232b, respectively. But as shown, individualized audio stream 224b for region 232b is received into region 232a and individualized audio stream 226a for region 232a is received into region 232b. To illustrate operation of dual mode audio stream generator 204, consider that dual mode audio stream generator 204 generates a cancellation signal, which is transmitted via right speaker 222 with individualized audio stream 226b to counteract the effects of individualized audio stream 226a. However, the cancellation signal is also transmitted with individualized audio stream 224b, which may or may not cause deleterious effects. To counter the cancellation signal arriving with individualized audio stream 224b at region 232a, dual mode audio stream generator 204 generates a compensation signal for transmission with individualized audio stream 224a. Note that the compensation signal is also transmitted with individualized audio stream 226a, and, in response, dual mode audio stream generator 204 can be configured to generate another cancellation signal, after which dual mode audio stream generator 204 can recursively generate other compensation signals. As used herein, the term "recursive" or variants thereof can refer to a process that is performed (e.g., determining or generating two or more signals, such as compensation signals) in a repeated fashion, regardless of whether the process determines signal data serially or in parallel. Note that the above-description can be viewed as conceptual in nature, with dual mode audio stream generator 204 being configured to perform a variety of techniques to obtain equivalent results of that described above.

Figure 3:
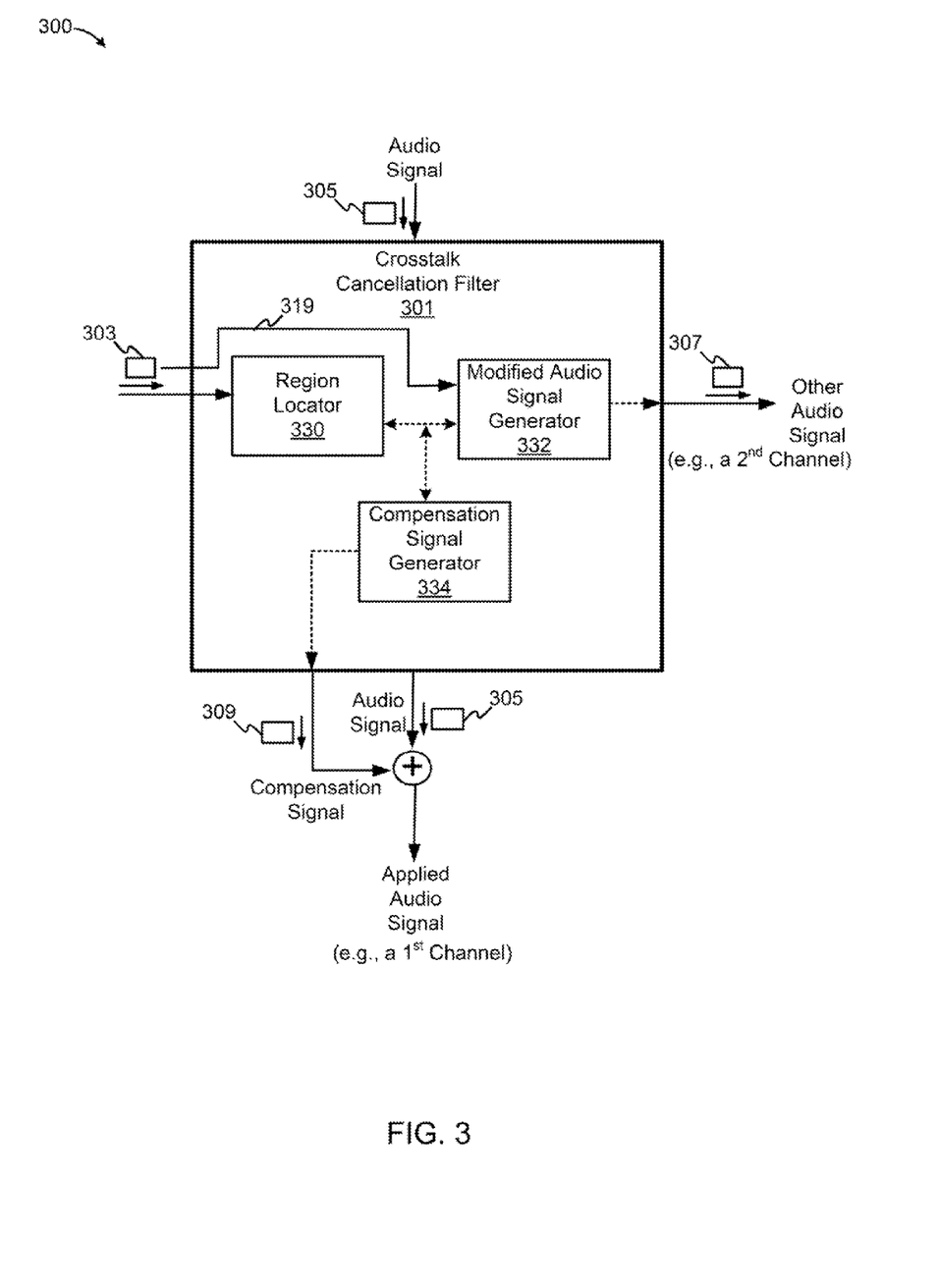
FIG. 3 is a block diagram illustrating an example of a crosstalk cancellation filter, according to an embodiment.

FIG. 3 is a block diagram illustrating an example of a crosstalk cancellation filter, according to an embodiment. In diagram 300, a crosstalk cancellation filter 301 includes a region locator 330, which is optional, a modified audio signal generator 332, and a compensation signal generator 334. An audio signal 305 is an input into crosstalk cancellation filter 301, where, at least in some cases, audio signal 305 is identified or designated as an audio stream that is targeted for propagation to a region at which an intended recipient user, such as user 1, resides. According to various embodiments, an audio stream (e.g., a first audio stream) is identified for reception at a first region. This audio stream is to be canceled at a second region (or any other region at which reception is not intended). The audio stream is received into modified audio signal generator 332, which is configured to modify the audio stream to form a modified first audio stream 307. In particular, modified audio signal generator 332 is configured to generate an acoustic signal, such as signal 307, that is configured to cancel or otherwise reduce the audio stream as it is received into a region other than the intended target region. Further, modified audio signal generator 332 is configured to designate that signal 307 is to be projected at one or more loudspeakers (or one or more channels) other than the loudspeaker that projects the audio signal. Modified first audio stream 307 is configured to arrive at a non-intended region, such as a second region, to combine with the audio stream to cancel (e.g., reduce) the perceptibility of the audio stream at the second region. For example, if the audio signal is designated to propagate from a left speaker (associated with a first channel), then modified first audio stream 307 can be designated to propagate from a right speaker (associated with a second channel). According to some embodiments, modified audio signal generator 332 is configured to invert the audio stream (e.g., the first audio stream) to form an inverted audio stream, which is then delayed by an amount of delay (e.g., as a function of the relative locations of the regions). Further, the delayed, inverted audio stream can be attenuated to form a modified audio stream 307. The modified first audio stream 307, in at least some embodiments, can be described as a cancellation signal. In some embodiments, modified audio signal generator 332 is configured to receive location data 303 that describe locations of regions (and/or users). Location data 303 can be static data provided over path 319, the static data representing the relative distances and positions of the regions relative to the loudspeakers. In some cases, location data 303 can be dynamic data, which represents real-time (or near real-time) distances and positions automatically determined by using, for example, a camera or a wearable device. Dynamic location data 303 is received into region locator 330, which is configured to calculate the distances and positions. Region locator 330 provides such information to modified audio signal generator 332 for generating updated versions of modified first audio stream 307 to compensate for changes in positions of one or more users or regions.

Compensation signal generator 334 is configured to generate a compensation signal 309 to compensate for the added modified audio stream 307 that is received into the region (e.g., into a first region). In some embodiments, compensation signal generator 334 is configured to determine modified audio stream 307 (e.g., as a first cancellation signal) at the region as a first region cancellation signal (which can be generated based on modified audio stream 307 received into the region). In particular, a cancellation signal 307 that is intended for region 2 is received into region 1. Further, compensation signal generator 334 is configured to designate compensation signal 309 for projection to the region via a loudspeaker conveying the audio stream 305, such as a left speaker, whereby compensation signal 309 combines with the first region cancellation signal (e.g., modified audio stream 307) at the region to cancel (e.g., reduce) the modified audio stream 307 and/or its perceptibility at the region.

Modified audio signal generator 332 is configured to generate another acoustic signal configured to cancel compensation signal 309 that is received with audio stream 305 into another region (e.g., region 2), to reduce or negate the perceptibility of compensation signal 309 at a second region, when compensation signal 309 is intended for a first region. Modified audio signal generator 332 is configured to identify compensation signal 309 to be canceled at, for example, a second region, and sis further configured to modify compensation signal 309 to form a modified compensation signal. In various embodiments, the modified version of compensation signal 309 can be described as a second cancellation signal. Also, modified audio signal generator 332 is configured to designate the second for projection via, for example, a second channel loudspeaker to the second region. At the second region, the second cancellation signal combines with compensation signal 309 to reduce the magnitude of compensation signal 309 or otherwise render it imperceptible at the second region. To compensate for the second cancellation signal received at the first region, compensation signal generator 334 is configured to generate a second compensation signal to reduce or cancel the second cancellation signal received in the first region. In various embodiments, modified audio signal generator 332 is configured to form any number of cancellation signals, including modified audio stream 307, to be projected via a second channel loudspeaker, and compensation signal generator 334 is configured to form (e.g., recursively) any number of compensation signals, including compensation signal 309, to compensate for the presence of the number of cancellation signals at a region (e.g., at the first region).

According to some embodiments, compensation signal generator 334 is configured to generate a determined amount of compensation signals to sufficiently compensate for an amount of cancellation signals generated. Note that modified audio signal generator 332 can optionally include equivalent logic to perform the following as well. In some examples, subsequently-generated compensation signals and/or cancellation signals are attenuated during the generation of a compensation signal and/or a cancellation signal. As such, a finite number of compensation signals (and cancellation signals) can be generated to ensure that the magnitude of either a compensation signal or a cancellation signal is sufficiently muted or made imperceptible. For example, compensation signal generator 334 can be configured to determine a magnitude of a compensation signal (e.g., either before or after being generated), and can be further configured to determine whether to form subsequent compensation signals based on a threshold magnitude. In some examples, a threshold magnitude can represent a magnitude of either a compensation signal or a cancellation signal under which a user (e.g., an average user) may not sufficiently perceive the presence of such compensation and cancellation signals. Examples of a threshold magnitude can include magnitudes ranging from 0 dB to 10 dB, or from 0 dB to 50 dB, or the like, whereby users likely cannot sufficiently perceive such generated signals. In some examples, the threshold magnitude can influence the number of acoustic signals that a crosstalk cancellation filter generates. According to some embodiments, compensation signal generator 334 is configured to automatically and dynamically modify or change the threshold magnitude, as a function, for example, of level of ambient noise or audio received by the regions. For example, consider that two users, each being co-located in a common space at different locations in a room, are participating in a teleconference with remote users. A shared audio stream includes the voices and audio associated with the remote users. Should the shared audio stream increase in magnitude (e.g., a remote participant is located in an airport with background noise intensity approaching 90 dB), the shared audio stream projected to a region, such a region 2, causes otherwise perceptible signals (e.g., perceptible compensation signals) to be rendered imperceptible. As such, the threshold magnitude can be raised so as to reduce the number of iterative compensation and/or cancellation signals that are to be produced. By contrast, if the shared audio stream decreases in magnitude (e.g., the remote participant located at the airport drops off the call, and the sound intensity associated with the shared audio stream drops to 50 dB), then compensation signal generator 334 can also reduce in real-time (or near real-time) the threshold magnitude, which may influence the quantity of acoustic signals generated by a crosstalk cancellation filter. A crosstalk cancellation filter 301, or portions thereof, can be implemented as either a circuit-based filter or an algorithmic-based filter, or as a combination thereof, according to some embodiments. In one example, crosstalk cancellation filter 301 can be implemented as a finite impulse response ("FIR") filter having multiple taps at which one or more signals or magnitudes thereof can be associated.

Figure 4:
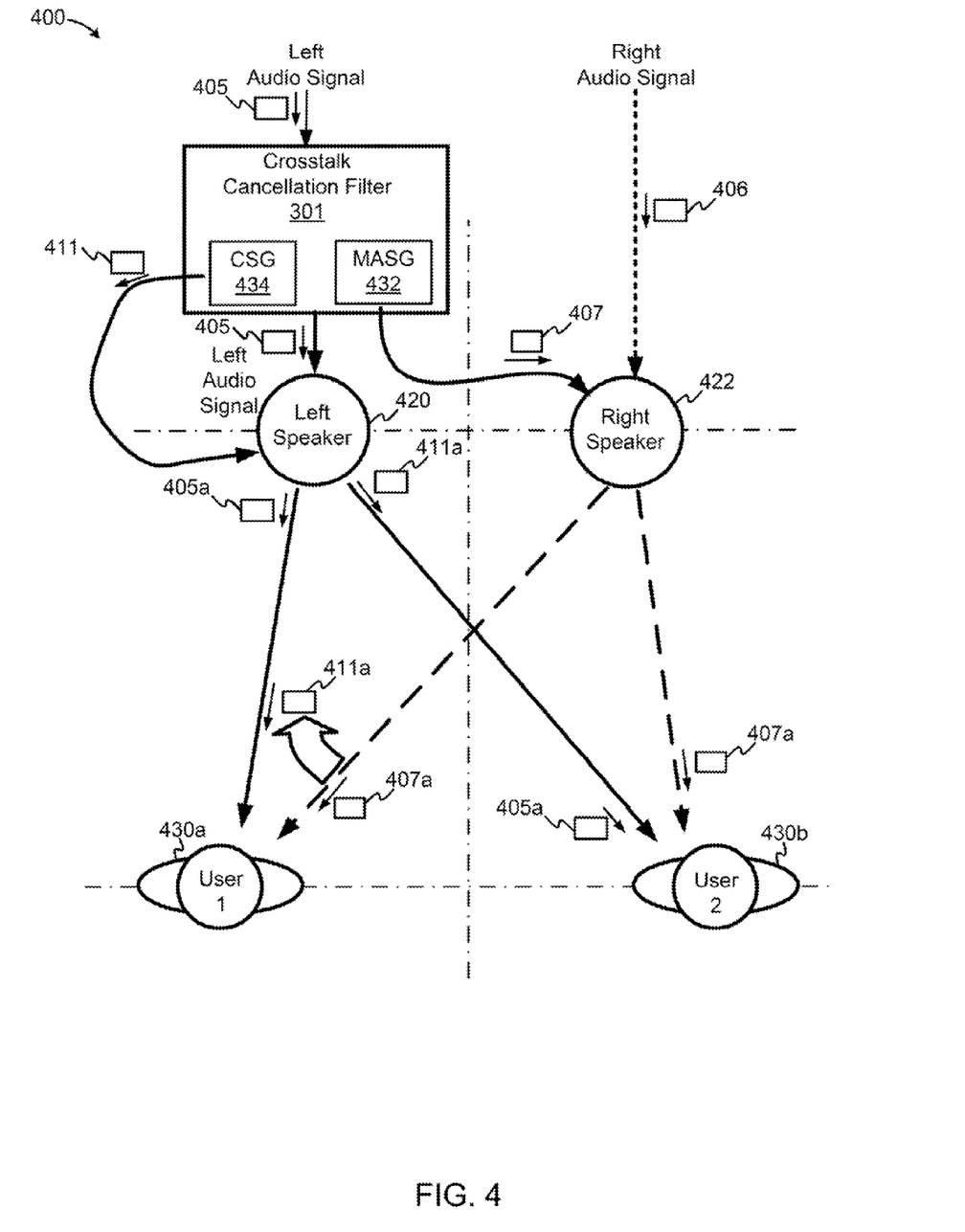
FIGS. 4 and 5 depict functional block diagrams of a crosstalk cancellation filter configured to generate acoustic signals, according to some embodiments.
Figure 5:
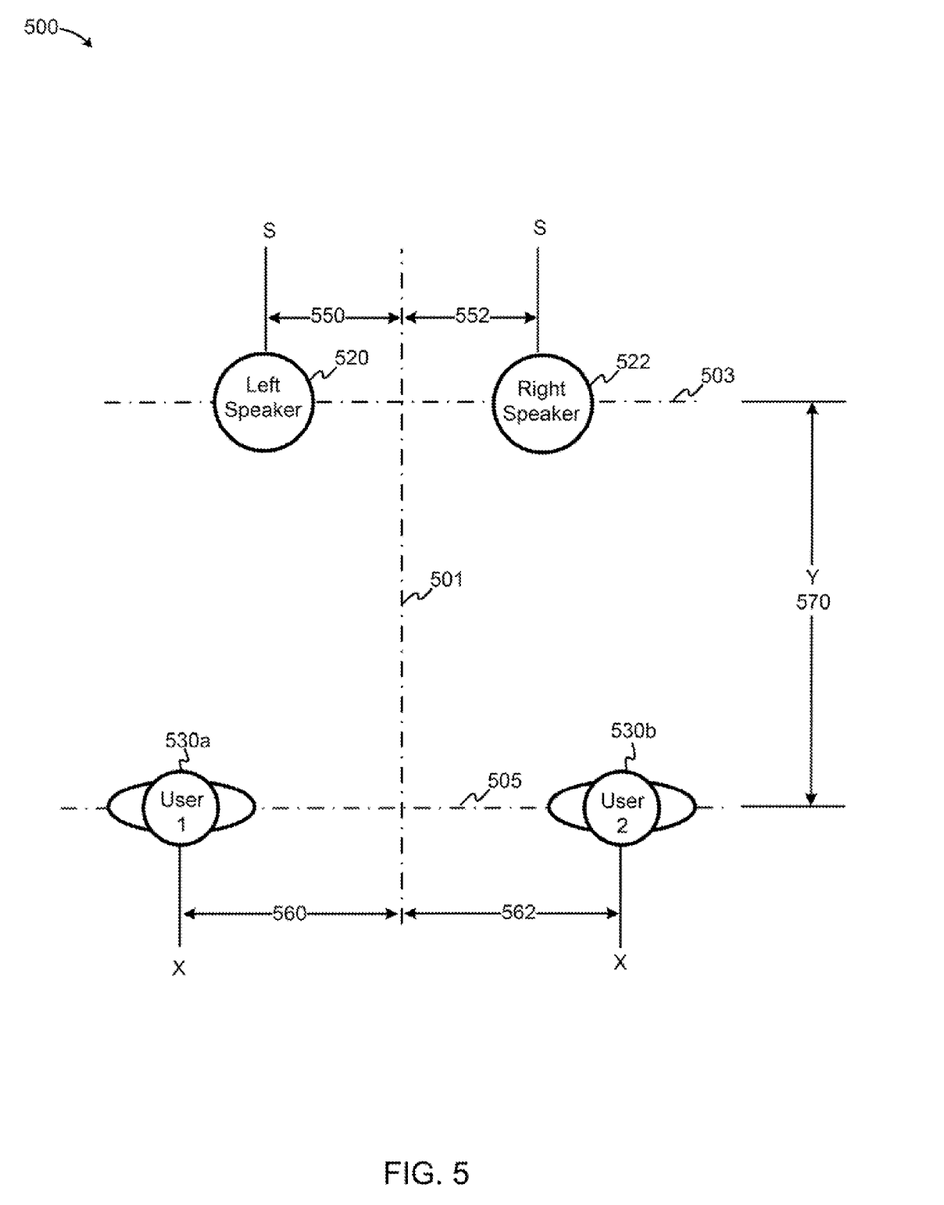

FIGS. 4 and 5 depict functional block diagrams of a crosstalk cancellation filter configured to generate acoustic signals, according to some embodiments. Diagram 400 depicts a crosstalk cancellation filter 301 including a compensation signal generator ("CSG") 434 and a modified audio signal generator ("MASG") 432 configured to generate, among other things, acoustic signals such as compensation signals 411 and cancellation signals 407, respectively. As shown, a left audio signal 405 is provided to a left speaker 420 for, among other things, communicating audio signal 405 to user 430a. Similarly, a right audio signal 406 is provided to a right speaker 422 for, among other things, communicating audio signal 406 to user 430b. For purposes of discussion, audio signals 405 and 406 can be individualized audio signals for exclusive reception by user 430a and 430b, respectively, but need not be so. A crosstalk cancellation filter for audio signal 406, while not shown, can be implemented similar to crosstalk cancellation filter 406. As used herein, the term "audio signal" can generally refer to signals (e.g., electronic signals) configured generate audio, and the term "audio stream" can generally refer to audio produced by sound waves in a medium, such as air. As audio signals and audio streams are related to each other, an ordinarily skilled artisan appreciates that the terms "signal" and "stream," as used herein, are interchangeable.

FIG. 5 depicts an example of an arrangement of regions relative to loudspeakers, according to some embodiments. Diagram 500 depicts a left loudspeaker 520 and a right loudspeaker 552 centered on centerline 503 at distances ("S") 550 and 552 from centerline 501. Also, user ("1") 530a and user ("2") 530b are disposed on centerline 505 at distances ("X") 560 and 562 from centerline 501. Centerlines 503 and 505 are positioned at a distance ("Y") 570 from each other. These dimensions can be used by compensation signal generator ("CSG") 434 and modified audio signal generator ("MASG") 432 of FIG. 4 to determine acoustic signals, according to at least some embodiments. Note that the relative positions of user 530a and user 530b are not limiting (e.g., the positions of user 530a and user 530b can be dynamic). To illustrate the functionality of compensation signal generator ("CSG") 434 and modified audio signal generator ("MASG") 432 of FIG. 4, consider that an audio signal (or an acoustic signal) is transmitted via left loudspeaker 520. As such, an audio signal travels a distance from loudspeaker 520 to user 530a in region 1 as follows:

$$D_{L1} = \sqrt{Y^2 + (X-S)^2},$$

while the audio signal travels a distance from loudspeaker 520 to user 530b in region 2 as follows:

$$D_{L2} = \sqrt{Y^2 + (X+S)^2}.$$

Thus, the difference in the path lengths from loudspeaker 520 to user 530a and user 530b is as follows:

$$D_{L12} = \sqrt{Y^2 + (X+S)^2} - \sqrt{Y^2 + (X-S)^2},$$

A time delay between the audio as received by user 530a and user 530b can be estimated as follows:

$$t_{L12} = \frac{\sqrt{Y^2 + (X+S)^2} - \sqrt{Y^2 + (X-S)^2}}{c},$$

where "c" is the speed of sound in air. Note that audio arrives from right loudspeaker 522 at user 530b at about the same time as audio from left loudspeaker 520 arrives at user 530a.

Referring back to FIG. 4, consider that modified audio signal generator 432 is configured to invert audio signal 405 to left loudspeaker 420 (i.e., the magnitude of audio signal 405 is multiplied by −1, which can be equivalent to a phase shift of 180 degrees). Further, modified audio signal generator 432 is configured to delay the inverted audio signal by a time equal to $t_{L12}$, which is transmitted as cancellation signal 407 via right loudspeaker 422 to user 430b. In some embodiments, such an effect may be achieved by a filter, such as an FIR filter having coefficients set to zero except for one coefficient having a value of −1 at a filter tap corresponding to a desired delay.

Next, consider audio received into a region including user 430b. Audio signal 405a generated by left loudspeaker 420 arrives at a region including user 430b coincident to (or nearly coincident to) the arrival of cancellation signal 407a (e.g., a delayed and inverted version of audio signal 405a) from right loudspeaker 422. Therefore, these signals 405a and 407a can be combined with each other (e.g., interfere with each other) to cancel each other. Thus, user 430b can perceive a much quieter signal (or a less perceptible signal) than does user 430a.

Note that audio signal 405a travels a distance $D_{L2}$ to user 430b, and delayed cancellation signal 407a from right loudspeaker 422 travels a distance $D_{R1} = D_{L1}$. In accordance with the inverse square law, audio signal 405a travels a farther distance, and thus, is quieter. Therefore, MASE 432 can attenuate the magnitude of cancellation signal 407a to match that of audio sign 405a at user 430b. Thus, cancellation signal can be attenuated by an amount as follows:

$$\text{Attenuation} = \frac{D_{L1}^2}{D_{L2}^2},$$

whereby audio signal 405a and cancellation signal 407a (e.g., an attenuated, inverse and delayed signal) can cancel each other with little to no perceptibility. In some embodiments, such a function can be implemented in or as part of a FIR filter with a coefficient equal to $$-\frac{D_{L1}^2}{D_{L2}^2}$$

at a tap of filter, such as indicated above:

Next, consider that cancellation signal 407a from right loudspeaker 422 can be received into a region including user 430a, which may be perceived as an echo. Note that cancellation signal 407a is delayed by $t_{L12}$ on top of the delay introduced earlier, and thus arrives at left loudspeaker 420 at a time delay of $2t_{L12}$ after audio signal 405 arrives at left loudspeaker 420. Also, cancellation signal 407a can be further attenuated by the distance travelled (in addition to attenuation introduced by filter 301). To reduce or cancel the effects of cancellation signal 407 at user 430a, a compensation signal 411a is generated by compensation signal generator 434. In some examples, CSG 434 can be configured to introduce compensation signal 411a with the propagation of audio signal 405a. Compensation signal 411a can be formed by delaying, for example, cancellation signal 407a, by a time delay of $2t_{L12}$ and attenuating the signal by $$\left(\frac{D_{L1}^2}{D_{L2}^2}\right)^2,$$

which can be provided by injecting audio signal 405 into, for example, a FIR filter with appropriate taps.

Note that the generation of compensation signal 411a also causes that signal to be transmitted from loudspeaker 420 to user 430b. To address this condition, a second cancellation signal can be generated, in a manner similar to the first cancellation signal, to cancel the effects of compensation signal 411a at user 430b. Note that the second cancellation signal and subsequent compensation signals are at a lower and lower volume. Thus, after some number of iterations (e.g., that is or is not associated with a threshold magnitude), a subsequent compensation signal can be sufficiently quiet such that the signal is effectively inaudible (or at least sufficiently inaudible for the application purposes) and need not be compensated for any further. In some embodiments, a single compensation filter can be used for each channel, with taps at odd multiples of $t_{L12}$ for the Wright channel and even multiples for the left channel, with the taps decaying by a factor or $$\left(\frac{D_{L1}^2}{D_{L2}^2}\right).$$

As such, the recursive determination of compensation signals can be implemented in parallel to each other rather than serially. Note further that the above discussion can apply similarly to audio signals 406 generated by right loudspeaker 422.

Figure 6:
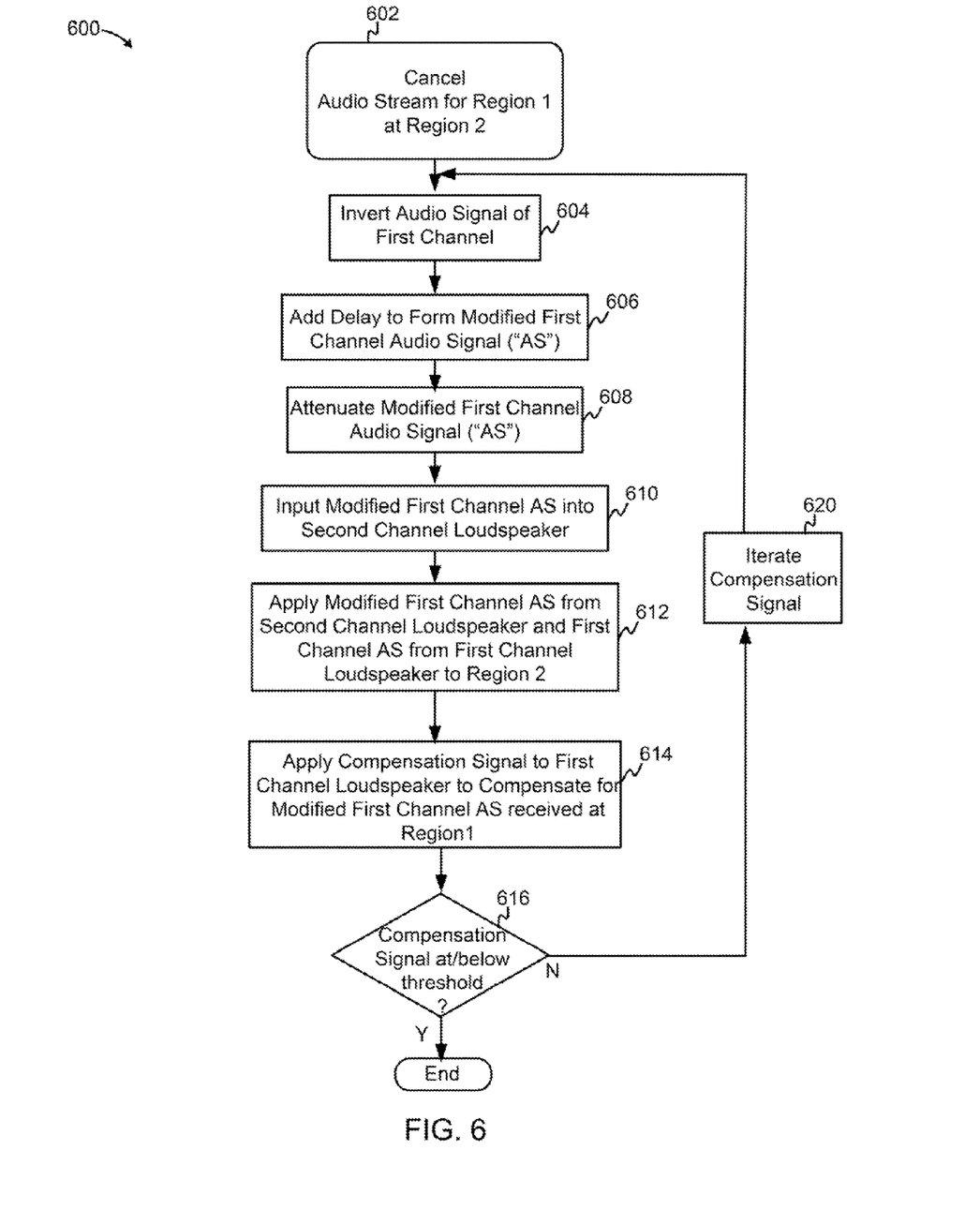
FIG. 6 is an example of a flowchart illustrating the generation of individualized audio signals in accordance with some embodiments.

FIG. 6 is an example of a flowchart illustrating the generation of individualized audio signals in accordance with some embodiments. As shown in FIG. 76A, flow 600 begins at 602, at which a determination is made to cancel an audio stream for a first region that is received into a second region. At 604, the audio stream is inverted and delayed at 606 to form a modified first channel audio signal. This signal can be attenuated at 608 to form an attenuated version of the modified first channel audio signal. At 610, the modified first channel audio signal, as a cancellation signal, is introduced into a second channel loudspeaker. At 612, the modified first channel audio signal (or stream) and the audio stream are applies to region 2, at which both signal cancel each other out or otherwise render each other imperceptible or nearly so. At 614, a compensation signal is generated and applied to a first channel loudspeaker to compensate for receiving the modified first channel audio signal (or stream) into the first region. Optionally, a determination is made at 616 as to whether a compensation signal has a magnitude below a threshold magnitude. It the magnitude remains above the threshold, flow 600 iterates at 620 to form another compensation signal to further compensate for other cancellation signals, for example.

Figure 7:
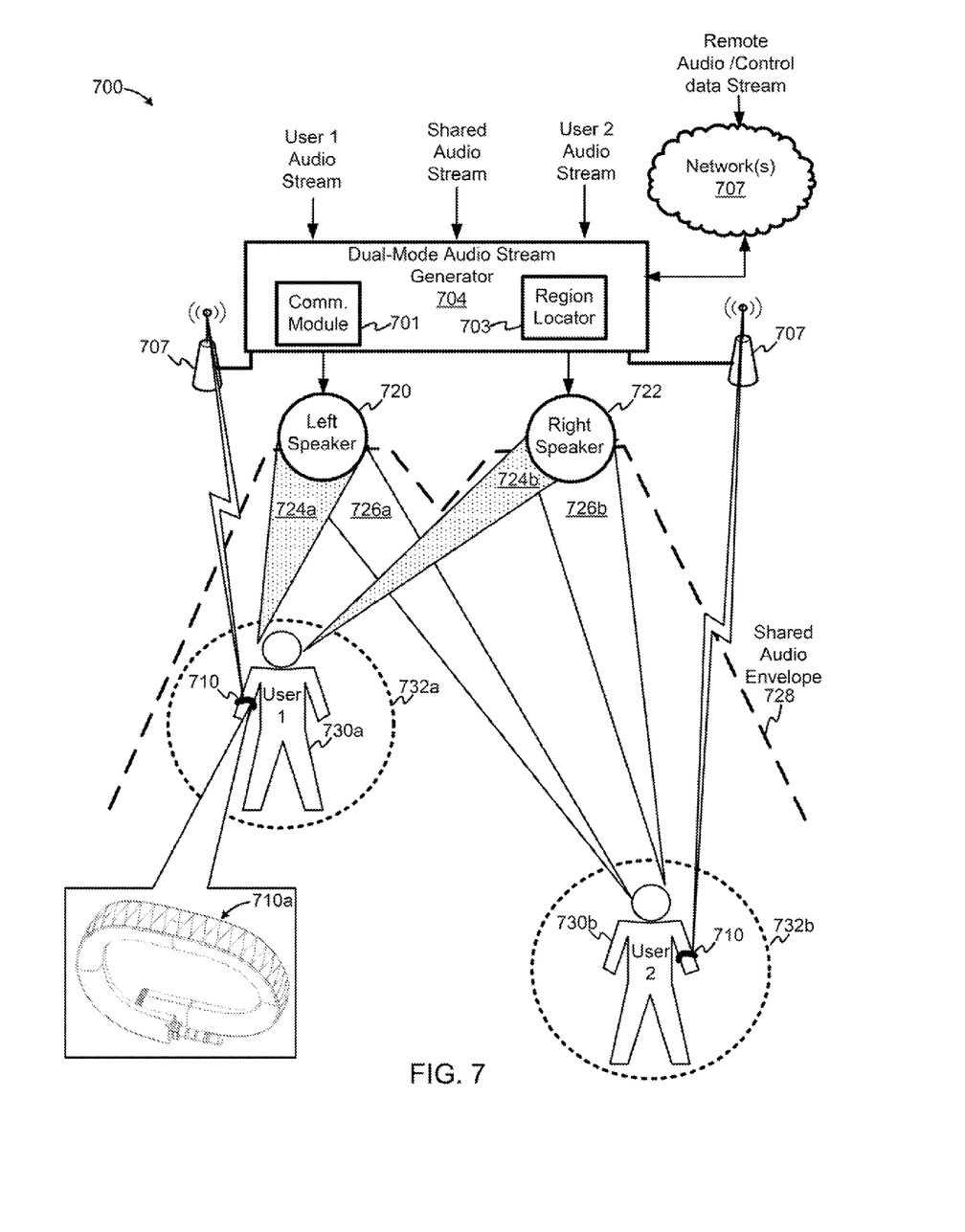
FIG. 7 is a block diagram illustrating an example of a dual mode audio stream generator configured to determine location data dynamically, according to an embodiment.

FIG. 7 is a block diagram illustrating an example of a dual mode audio stream generator configured to determine location data dynamically, according to an embodiment. In diagram 700, a dual mode audio stream generator 704 receives input audio (e.g., user 1 audio stream, user 2 audio stream, and shared audio stream), and generates audio and acoustic signals for transmission to a left speaker 720 and a right speaker 722, whereby the acoustic signals are configured to implement individualized audio stream to specific users. Examples of acoustic signals include cancellation signals, compensations signals, and other like signals. While dual mode audio stream generator 704 is configured to generate one or more shared audio streams, as depicted as shared audio envelope 728. As shown, dual mode audio stream generator 704 is configured to convey individualized audio streams to different regions, such as region ("1") 732a and region ("2") 732a. In some cases, region 732a and region 732b is determined include user ("1") 730a and user ("2") 730b, respectively, by the use of corresponding wearable computing devices. Audio streams 724a and 726b include individualized audio streams originating by left speaker 720 and by right speaker 722 for region 732a and region 732b, respectively. But as shown, individualized audio stream 724b for region 732b is received into region 732a and individualized audio stream 726a for region 732a is received into region 732b.

Dual mode audio stream generator 704 also includes a communication module 701 to receive data via wireless endpoints 707 and a region locator 703 configured to dynamically calculate the locations of user 730a and user 730b based on data transmitted from wearable devices 710.

To illustrate operation of dual mode audio stream generator 704, consider that dual mode audio stream generator 704 generates a cancellation signal, which is transmitted via right speaker 722 with individualized audio stream 726b to counteract the effects of individualized audio stream 726a. However, the cancellation signal is also transmitted with individualized audio stream 724b, which may or may not cause deleterious effects. To counter the cancellation signal arriving with individualized audio stream 724b at region 732a, dual mode audio stream generator 704 generates a compensation signal for transmission with individualized audio stream 724a. Note that the compensation signal is also transmitted with individualized audio stream 726a, and, in response, dual mode audio stream generator 704 can be configured to generate another cancellation signal, after which dual mode audio stream generator 704 can recursively generate other compensation signals. As used herein, the term "recursive" or variants thereof can refer to a process that is performed (e.g., determining or generating two or more signals, such as compensation signals) in a repeated fashion, regardless of whether the process determines signal data serially or in parallel. Note that the above-description can be viewed as conceptual in nature, with dual mode audio stream generator 704 being configured to perform a variety of techniques to obtain equivalent results of that described above.

Examples of wearable computing device 710a include sensors to receive signals from global positioning system ("GPS") satellites, or others, without limitation. Wearable computing device 710a can include a GPS receiver, or any location-based service sensor (e.g., sensor for determining location within a cellular or micro-cellular network, which may or may not use GPS or other satellite constellations for fixing a position). Further, a location-related sensor can be configured to identify or obtain location-based data. For example, a GPS receiver may be used to obtain coordinates of the geographic location of a wearable computing device 710a using, for example, various types of signals transmitted by civilian and/or military satellite constellations in low, medium, or high earth orbit (e.g., "LEO," "MEO," or "GEO"). In other examples, differential GPS algorithms may also be implemented with a GPS receiver, which may be used to generate more precise or accurate coordinates. Still further, location-based services sensors may be implemented to obtain location-based data including, but not limited to location, nearby services or items of interest, and the like. As an example, location-based services sensors may be configured to detect an electronic signal, encoded or otherwise, that provides information regarding a physical locale of wearable computing device 710a. The electronic signal may include, in some examples, encoded data regarding the location and information associated therewith. Other types of suitable location-related sensors apart from those described may also be used, including magnetic flux sensors such as solid-state compasses and the like, including gyroscopic sensors. Examples of wearable computing devices are described in U.S. application Ser. Nos. 13/433,204, 13/454,040, 13/433, 208, 13/433,213, 13/361,919, 13/181,495, 13/492,776, 13/492,770, 13/180,000, 13/492,857, 13/180,320, and 13/181,513, any of which or all of which are incorporated herein by reference.

According to some embodiments, various loudspeakers can operate optimally to create different audio streams for user 1 and user 2 when the location and geometry of the users relative to the speakers are fairly well known and substantially fixed, so that the delay and attenuation factors can be calculated in advance. In other embodiments, the locations of the users relative to the speakers can be updated (by a sensing process and/or distance-determining process, such as determined by wearable devices). For example, static location data can be for use in situations with fixed seating, such as, for example, in a car, where the positions of the driver and passenger are well-constrained, and subtend a reasonable angle with the midline. As mentioned, the positions of user 1 and user 2 may be varied, and, thus, the implementations described herein can be operative to perform a set of calculations similar to those previously described for the revised or updated position data to generate the appropriate filter coefficients for the new locations. Thus, various implementations may be used in situations with variable user positions, with improved performance being obtained when some feedback is provided to enable the new position(s) to be determined. For example, a visual display might be provided to enable users to highlight where they wish to sit, or a camera might be used together with person/facial recognition software to determine the actual seating position of a user or users and to then generate an optimal filter for their actual position(s). Or, wearable devices shown in FIG. 7 can be used.

Various implementations can enable the following: multiple players of a single game to experience audio personalized to their progress in the game, while sharing audio corresponding to everyone's progress in the game; allowing individuals participating in a conference call to receive relatively private information during that call that could include, side-conversations from other users; secondary audio streams, such as notifications, audio delivery of information (such as things to say, backup statistics), etc.; allowing multiple occupants of a shared space (for example a car) to listen to different audio tracks (music or TV/film soundtracks, for example); and to enhance the experience of individual users who are sharing a film/game/etc. by creating individualized soundtracks for each of them with each of them as the center of the audio field.

Figure 8:
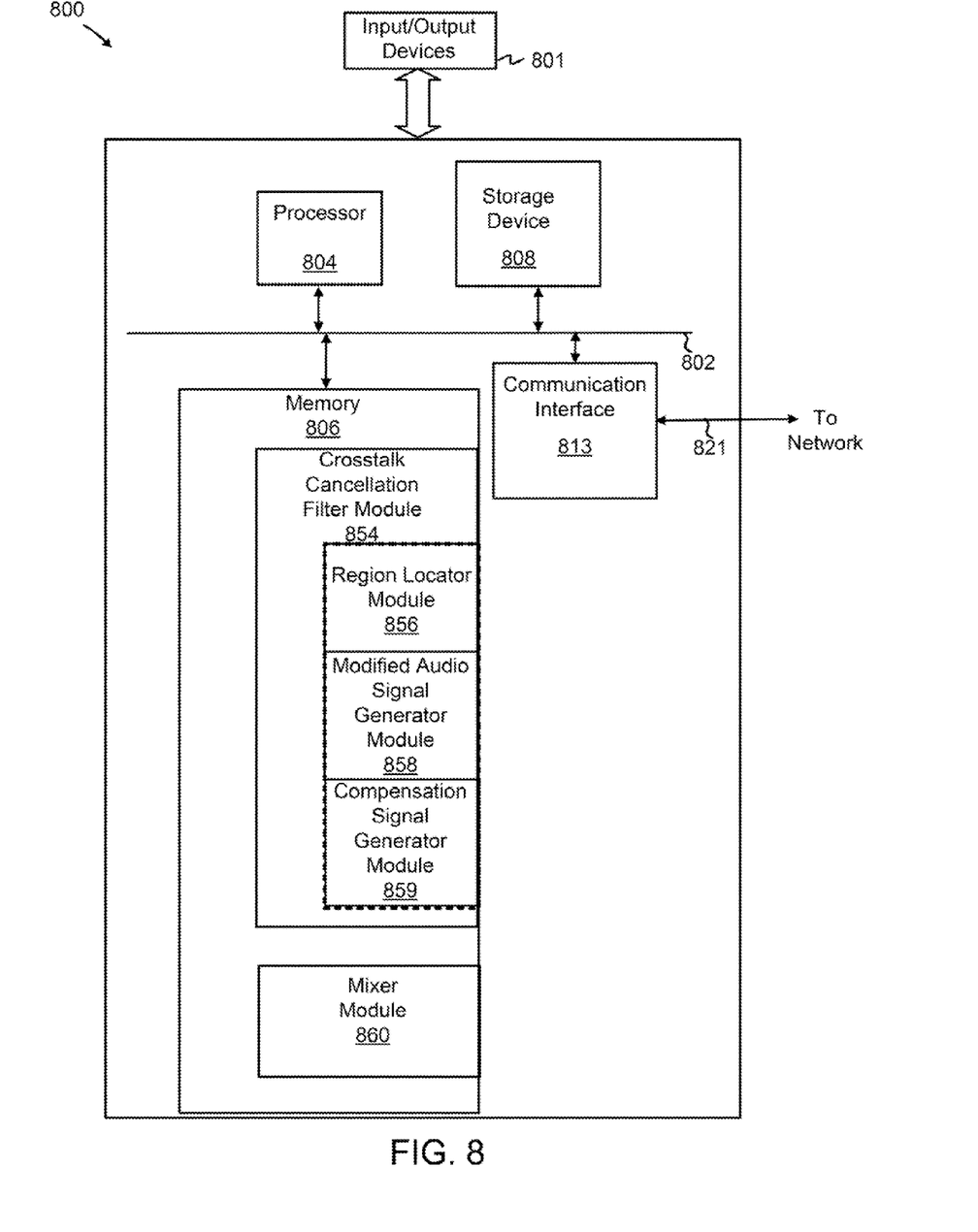
FIG. 8 illustrates an exemplary computing platform in accordance with various embodiments.

FIG. 8 illustrates an exemplary computing platform in accordance with various embodiments. In some examples, computing platform 800 may be used to implement computer programs, applications, methods, processes, algorithms, or other software to perform the above-described techniques. Computing platform 800 includes a bus 802 or other communication mechanism for communicating information, which interconnects subsystems and devices, such as processor 804, system memory 806 (e.g., RAM, etc.), storage device 808 (e.g., ROM, etc.), a communication interface 813 (e.g., an Ethernet or wireless controller, a Bluetooth controller, etc.) to facilitate communications via a port on communication link 821 to communicate, for example, with a computing device. Processor 804 can be implemented with one or more central processing units ("CPUs"), such as those manufactured by Intel® Corporation, or one or more virtual processors, as well as any combination of CPUs and virtual processors. Computing platform 800 exchanges data representing inputs and outputs via input-and-output devices 801, including, but not limited to, keyboards, mice, audio inputs (e.g., speech-to-text devices), user interfaces, displays, monitors, cursors, touch-sensitive displays, and other I/O-related devices.

According to some examples, computing platform 800 performs specific operations by processor 804 executing one or more sequences of one or more instructions stored in system memory 806, and computing platform 800 can be implemented in a client-server arrangement, peer-to-peer arrangement, or as any mobile computing device, including smart phones and the like. Such instructions or data may be read into system memory 806 from another computer readable medium, such as storage device 808. In some examples, hard-wired circuitry may be used in place of or in combination with software instructions for implementation. Instructions may be embedded in software or firmware. The term "computer readable medium" refers to any tangible medium that participates in providing instructions to processor 804 for execution. Such a medium may take many forms, including but not limited to, non-volatile media and volatile media. Non-volatile media includes, for example, optical or magnetic disks and the like. Volatile media includes dynamic memory, such as system memory 806.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read. Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 802 for transmitting a computer data signal.

In some examples, execution of the sequences of instructions may be performed by computing platform 800. According to some examples, computing platform 800 can be coupled by communication link 821 (e.g., a wired network, such as LAN, PSTN, or any wireless network) to any other processor to perform the sequence of instructions in coordination with (or asynchronous to) one another. Computing platform 800 may transmit and receive messages, data, and instructions, including program, i.e., application code, through communication link 821 and communication interface 813. Received program code may be executed by processor 804 as it is received, and/or stored in memory 806, or other non-volatile storage for later execution.

In the example shown, system memory 806 can include various modules that include executable instructions to implement functionalities described herein. In the example shown, system memory 806 includes a crosstalk cancellation filter module 854 configured to cancel audio at one region that is intended for reception in another region. Crosstalk cancellation filter module 854 can include a region locator module 856, a modified audio signal generator module 858, and a compensation signal generator module 859. In some embodiments, system memory 806 can also include a mixer module 859 configured to provide one or more functions described herein.

As used herein, the use of "a," "an," or "the" is intended to mean "at least one," unless specifically indicated to the contrary. While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications can occur to those with ordinary skill in the art.

In at least some examples, the structures and/or functions of any of the above-described features can be implemented in software, hardware, firmware, circuitry, or a combination thereof. Note that the structures and constituent elements above, as well as their functionality, may be aggregated with one or more other structures or elements. Alternatively, the elements and their functionality may be subdivided into constituent sub-elements, if any. As software, the above-described techniques may be implemented using various types of programming or formatting languages, frameworks, syntax, applications, protocols, objects, or techniques. As hardware and/or firmware, the above-described techniques may be implemented using various types of programming or integrated circuit design languages, including hardware description languages, such as any register transfer language ("RTL") configured to design field-programmable gate arrays ("FPGAs"), application-specific integrated circuits ("ASICs"), or any other type of integrated circuit. These can be varied and are not limited to the examples or descriptions provided.

Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

What is claimed:

1. A method comprising:
  identifying a first audio stream for reception at a first region to be canceled at a second region;
  modifying the first audio stream to form a modified first audio stream, the modifying further comprising forming a plurality of cancellation signals including the modified first audio stream to be projected via the second channel loudspeaker, and forming recursively a plurality of compensation signals including the compensation signal to compensate for the presence of the plurality of cancellation signals at the first region;
  designating the modified first audio stream to be projected via a second channel loudspeaker and the first audio stream via a first channel loudspeaker to the second region;
  acoustically combining the modified first audio stream and the first audio stream to reduce an effect of the first audio stream at the second region; and generating a compensation signal to reduce the modified first audio stream at the first region.

2. The method of claim 1, wherein the forming recursively the plurality of compensation signals further comprises:
determining a magnitude of one of the plurality of compensation signals; and
forming other compensation signals until a threshold magnitude is met.

3. The method of claim 2, further comprising:
selecting the threshold magnitude based on a magnitude of a shared audio stream.

4. The method of claim 1, further comprising:
identifying a second audio stream for reception at the second region to be canceled at the first region;
identifying a shared audio stream for reception at the first region and the second region; and
generating audio signals to project the first audio stream with reduced magnitude at the second region, the second audio stream with reduced magnitude at the first region, and the shared audio stream to the first region and the second region.

5. The method of claim 4, further comprising:
determining locations of the first region and the second region;
generating the modified first audio stream based on the locations;
determining updated locations of the first region and the second region; and
tuning automatically the modification of the first audio stream based on the updated locations.

6. The method of claim 5, wherein determining the updated locations of the first region and the second region further comprise:
receiving location data representing the updated locations from wearable computing devices,
wherein a first wearable computing device is disposed at the first region and a second wearable computing device is disposed at the second region.

7. The method of claim 4, further comprising:
selecting one of either the first region or the second region for receiving a private audio stream not intended for the other of either the first region or the second region,
wherein the private audio stream originates at a remote region.

8. The method of claim 7, wherein the private audio stream is generated during a teleconference in which audio signals of multiple remote regions are generated as a shared audio envelop, the private audio stream originating from the remote region of the multiple remote regions.

9. The method of claim 1, wherein modifying the first audio stream to form the modified first audio stream further comprises:
forming a first cancellation signal.

10. The method of claim 9, wherein generating the compensation signal further comprises:
determining the first cancellation signal at the first region to form a first region cancellation signal;
generating a first compensation signal as the compensation signal based on the first region cancellation signal;
designating the first compensation signal for projection via the first channel loudspeaker; and
acoustically combining the first compensation signal and the first region cancellation signal to reduce another effect of the first region cancellation signal.

11. The method of claim 9 further comprising:
identifying a first compensation signal to be canceled at the second region;
modifying the first compensation signal to form a modified first compensation signal as a second cancellation signal;
designating the second cancellation signal for projection via the second channel loudspeaker to the second region; and
acoustically combining the second cancellation signal and the first compensation signal to reduce an effect of the first compensation signal at the second region.

12. The method of claim 11, further comprising:
forming the second compensation signal to reduce an effect of the second cancellation signal at the first region.

13. The method of claim 1, further comprising:
identifying a shared audio stream for reception at the first region and the second region;
mixing the shared audio stream with at least the first audio stream configured to propagate from the first channel loudspeaker and a second audio stream configured to propagate from the second channel loudspeaker to form a mixed shared audio stream; and
projecting the mixed shared audio stream to the first region and the second region.

14. The method of claim 1, modifying the first audio stream to form a modified first audio stream further comprises:
inverting the first audio stream to form an inverted first audio stream; and
delaying the inverted first audio stream.

15. The method of claim 1, further comprising:
attenuating the modified first audio stream.

16. An apparatus comprising:
a dual-mode audio stream generator including one or more processors, the dual-mode audio stream generator configured to generate a shared audio stream in a first mode and generate multiple audio streams in a second mode for transmission via a loudspeaker system including at least a first loudspeaker for a first audio stream and a second loudspeaker for a second audio stream, at least one audio stream is isolated from receiving at least another of the audio streams, the dual-mode audio stream generator comprising;
a crosstalk cancellation filter for the first audio stream comprising:
a modified audio signal generator configured to generate one or more cancellation signals based on the first audio stream for transmission via the second loudspeaker, the first audio stream being projected via the second loudspeaker, and forming recursively a plurality of compensation signals including one or more compensation signals to compensate for the presence of the one or more cancellation signals; and
a compensation signal generator configured to generate the one or more compensation signals to compensate for the one or more cancellation signals,
wherein the one or more compensation signals are generated recursively until a threshold magnitude of at least one of the one or more compensation signals is achieved,
wherein either the first mode or the second mode, or both are active.

17. The apparatus of claim 16, further comprising:
a region locator configured to determine locations of a first region and a second region to which the multiple audio streams are projected, and to update the locations of the first region and the second region automatically.

18. The apparatus of claim 17, further comprising:
a communication module configured to establish communications with one or more wearable devices to receive data representing the locations.

\* \* \* \* \*